US010176217B1

(12) United States Patent
Dang et al.

(10) Patent No.: US 10,176,217 B1
(45) Date of Patent: Jan. 8, 2019

(54) DYNAMICALLY PERFORMING DATA PROCESSING IN A DATA PIPELINE SYSTEM

(71) Applicant: Palantir Technologies, Inc., Palo Alto, CA (US)

(72) Inventors: Hao Dang, Redmond, WA (US); Gustav Brodman, New York, NY (US); Yi Xue, New York, NY (US); Stacey Milspaw, Atlanta, GA (US); Yifei Huang, New York, NY (US); Yanran Lu, New York, NY (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 15/698,574

(22) Filed: Sep. 7, 2017

Related U.S. Application Data

(60) Provisional application No. 62/529,147, filed on Jul. 6, 2017.

(51) Int. Cl.
*G06F 17/30* (2006.01)
*G06F 9/455* (2018.01)

(52) U.S. Cl.
CPC .. *G06F 17/30371* (2013.01); *G06F 17/30312* (2013.01); *G06F 9/45533* (2013.01)

(58) Field of Classification Search
None
See application file for complete search history.

(56) References Cited

U.S. PATENT DOCUMENTS 5,568,390 A 10/1996 Hirota et al.
5,857,329 A 1/1999 Bingham
(Continued)

FOREIGN PATENT DOCUMENTS

EP 0652513 5/1995
EP 1926074 5/2008
(Continued)

OTHER PUBLICATIONS

Bogle et al., "Reducing Cross-Domain Call Overhead Using Batched Futures," SIGPLAN No. 29, 10 (Oct. 1994) pp. 341-354.
(Continued)

*Primary Examiner* — Amresh Singh
(74) *Attorney, Agent, or Firm* — Hickman Palermo Becker Bingham LLP

(57) ABSTRACT

Techniques for automatically scheduling builds of derived datasets in a distributed database system that supports pipelined data transformations are described herein. In an embodiment, a data processing method comprises, in association with a distributed database system that implements one or more data transformation pipelines, each of the data transformation pipelines comprising at least a first dataset, a first transformation, a second derived dataset and dataset dependency and timing metadata, detecting an arrival of a new raw dataset or new derived dataset; in response to the detecting, obtaining from the dataset dependency and timing metadata a dataset subset comprising those datasets that depend on at least the new raw dataset or new derived dataset; for each member dataset in the dataset subset, determining if the member dataset has a dependency on any other dataset that is not yet arrived, and in response to determining that the member dataset does not have a dependency on any other dataset that is not yet arrived: initiating a build of a portion of the data transformation pipeline comprising the member dataset and all other datasets on which the member dataset is dependent, without waiting for arrival of other datasets.

16 Claims, 6 Drawing Sheets

(56) References Cited

U.S. PATENT DOCUMENTS

| | | | |
|---|---|---|---|
| 5,902,349 A | 5/1999 | Endo et al. | |
| 6,496,774 B1 | 12/2002 | Davies | |
| 6,608,559 B1 | 8/2003 | Lemelson et al. | |
| 7,603,229 B2 | 10/2009 | Goldberg et al. | |
| 7,818,291 B2 | 10/2010 | Ferguson et al. | |
| 7,941,321 B2 | 5/2011 | Greenstein et al. | |
| 8,042,110 B1 | 10/2011 | Kawahara et al. | |
| 8,046,283 B2 | 10/2011 | Burns | |
| 8,108,138 B2 | 1/2012 | Bruce et al. | |
| 8,352,174 B2 | 1/2013 | Milstein et al. | |
| 8,417,409 B2 | 4/2013 | Bast et al. | |
| 8,763,078 B1 | 6/2014 | Castellucci et al. | |
| 8,786,605 B1 | 7/2014 | Curtis et al. | |
| 9,092,482 B2 | 7/2015 | Harris et al. | |
| 9,229,952 B1 * | 1/2016 | Meacham | G06F 17/3023 |
| 9,280,532 B2 | 3/2016 | Cicerone | |
| 2004/0153418 A1 | 8/2004 | Hanweck | |
| 2005/0021567 A1 * | 1/2005 | Holenstein | G06F 11/2097 |
| 2006/0241856 A1 | 10/2006 | Cobleigh et al. | |
| 2007/0088596 A1 | 4/2007 | Berkelhamer et al. | |
| 2007/0198571 A1 | 8/2007 | Ferguson et al. | |
| 2007/0220604 A1 | 9/2007 | Long | |
| 2008/0301559 A1 | 12/2008 | Martinsen et al. | |
| 2008/0313281 A1 | 12/2008 | Scheidl et al. | |
| 2009/0037912 A1 | 2/2009 | Stoitsev et al. | |
| 2009/0319418 A1 | 12/2009 | Herz | |
| 2010/0162371 A1 | 6/2010 | Geil | |
| 2010/0205662 A1 | 8/2010 | Ibrahim et al. | |
| 2011/0041084 A1 | 2/2011 | Karam | |
| 2011/0153592 A1 | 6/2011 | DeMarcken | |
| 2011/0185401 A1 | 7/2011 | Bak et al. | |
| 2011/0313979 A1 * | 12/2011 | Roberts | G06F 17/3051 707/690 |
| 2012/0101952 A1 | 4/2012 | Raleigh et al. | |
| 2012/0290506 A1 | 11/2012 | Muramatsu et al. | |
| 2013/0036346 A1 | 2/2013 | Cicerone | |
| 2013/0231862 A1 | 9/2013 | Delling et al. | |
| 2013/0286601 A1 | 10/2013 | Shin et al. | |
| 2014/0081685 A1 | 3/2014 | Thacker et al. | |
| 2014/0181833 A1 | 6/2014 | Bird et al. | |
| 2015/0120176 A1 | 4/2015 | Curtis et al. | |
| 2015/0261817 A1 | 9/2015 | Harris et al. | |
| 2016/0147730 A1 | 5/2016 | Cicerone | |

FOREIGN PATENT DOCUMENTS

| | | |
|---|---|---|
| EP | 2555126 | 2/2013 |
| EP | 2876587 | 5/2015 |
| WO | WO 2012/025915 | 3/2012 |

OTHER PUBLICATIONS

Ballesteros et al., "Batching: A Design Pattern for Efficient and Flexible Client/Server Interaction," Transactions on Pattern Languages of Programming, Springer Berlin Heildeberg, 2009, pp. 48-66.

Chen et al., "A Novel Emergency Vehicle Dispatching System," 2013 IEEE 77th Vehicular Technology Conference, IEEE, Jun. 2, 2013, 5 pages.

Yang et al., "An Enhanced Routing Method with Dijkstra Algorithm and AHP Analysis in GIS-based Emergency Plan," Geoinformatics, 2010 18th International Conference on, IEEE, Piscataway, New Jersey, Jun. 18, 2010, 6 pages.

Vose et al., "Help File for ModelRisk Version 5," 2007, Vose Software, pp. 349-353. [Uploaded in 2 Parts].

Stamos et al., "Remote Evaluation," Journal ACM Transactions on Programming Languages and Systems (TOPLAS), vol. 12, Issue 4, Oct. 1990, pp. 537-564.

Jotshi et al., "Dispatching and Routing of Emergency Vehicles in Disaster Mitigation Using Data Fusion." Socio-Economic Planning Sciences, Pergamon, Amsterdam, Netherlands, vol. 43, No. 1, Mar. 1, 2009, 24 pages.

Hart et al., "A Formal Basis for the Heuristic Determination of Minimum Cost Paths," IEEE Transactions on Systems Science and Cybernetics, IEEE, vol. 1, No. 2, Jul. 1, 1968, pp. 100-107.

Reedy, Sarah, "Policy and Charging Rules Function (PCRF)," Sep. 13, 2010, http://www.lightreading.com/document.asp?doc_id=680015 printed Dec. 10, 2013 in 4 pages.

Eklund et al., "A Dynamic Multi-source Dijkstra's Algorithm for Vehicle Routing," Intelligent Information Systems, 1996, pp. 329-333.

Mohring et al., "Partitioning Graphs to Speedup Dijkstra's Algorithm," ACM Journal of Experimental Algorithmics, Association of Computing Machinery, New York, New York, vol. 11, Jan. 1, 2006, 29 pages.

Wagner et al., "Dynamic Shortest Paths Containers," Electronic Notes in Theoretical Computer Science, vol. 92, No. 1, 2003, pp. 1-19.

Ashraf, "Protect your Google Account (Gmail) by enabling SMS (text message) notifications for Suspicious Activity," online article from dotTech, Jan. 24, 2013, https://dottech.org/94405/how-to-setup-text-message-sms-google-notifications-for-suspicious-activity/.

* cited by examiner

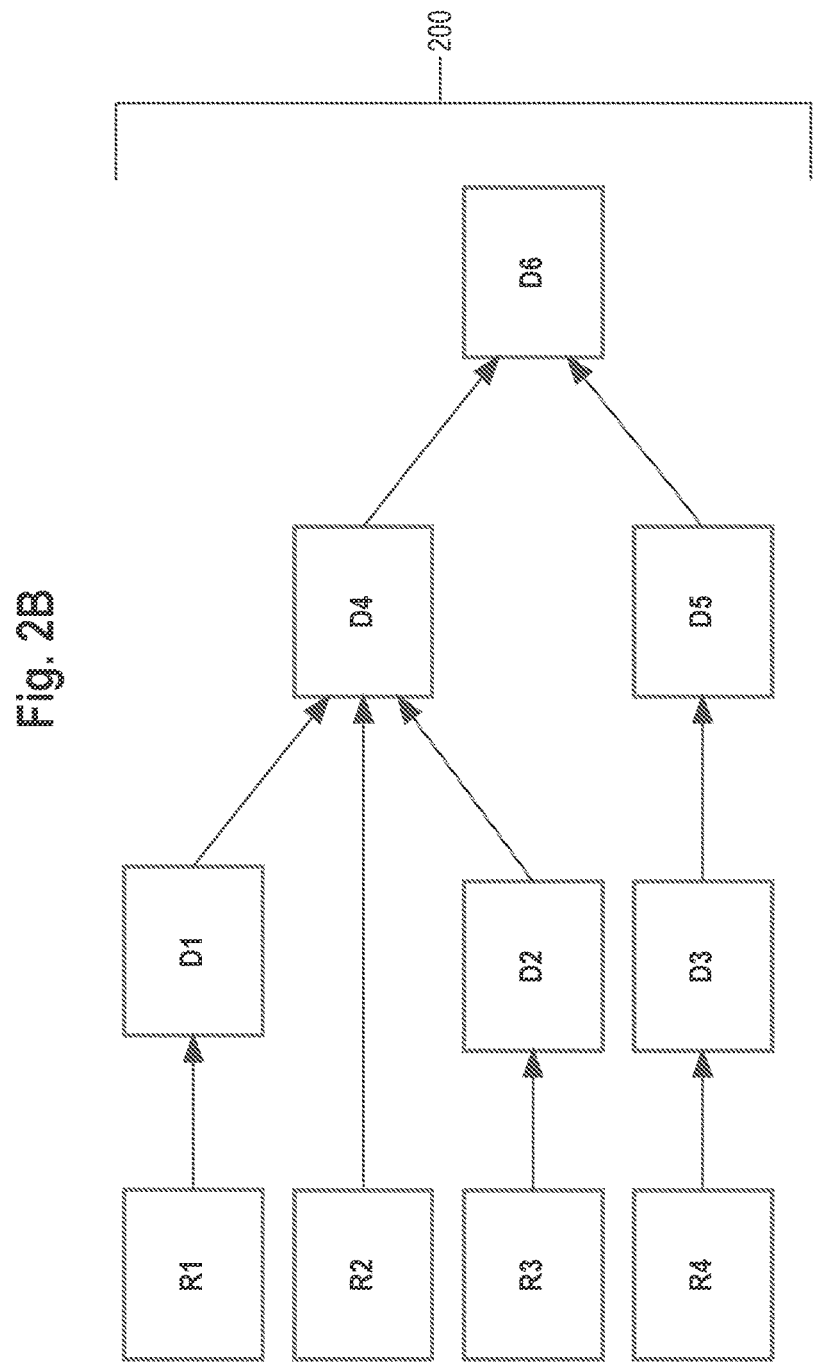

DYNAMICALLY PERFORMING DATA PROCESSING IN A DATA PIPELINE SYSTEM

BENEFIT CLAIM

This application claims the benefit under 35 U.S.C. 119(e) of provisional application 62/529,147, filed Jul. 6, 2017, the entire contents of which are hereby incorporated by reference for all purposes as if fully set forth herein.

FIELD OF THE DISCLOSURE

The present disclosure relates to computer-implemented distributed data processing systems. More specifically, the example embodiment(s) described below relate to computer-implemented techniques for automatically scheduling build jobs for derived datasets based on satisfying dependencies.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A data pipeline system can include a plurality of datasets that are dependent on one another. Raw datasets represent data drawn from data source, such as a file system, database, or other data source. A complex dataset may be built by a data processing job on one or more input datasets upon which the complex dataset is dependent on. Thus, a complex dataset may be built based on a combination of raw datasets or other complex datasets. Thus, the overall data pipeline system may include a graph of dependencies of raw datasets and complex datasets. Traditional techniques for rebuilding complex datasets include waiting for all raw datasets to be updated before building, or setting a cutoff time for rebuilding all complex datasets. However, such techniques can be time-intensive and resource-intensive. Thus, what is needed is a technique for dynamically building complex datasets as soon as possible, to improve system resource usage and efficiency.

More specifically, distributed data processing systems are now available that implement data pipelines capable of executing serial or serial-parallel transformations on data tables. In an example pipeline, one or more raw datasets are used to build one or more derived datasets, according to one or more transformations. Source code development languages are available for expressing table schemas, transformations and other functional operations on rows or columns in the form of natural language code that can be transformed and committed in an executable form such as a SQL query.

Usually a sizable data pipeline requires rebuilding the derived datasets at least once per day, to ensure that the derived datasets accurately reflect updates to the raw datasets and any changes in the transformations. When the number and size of the datasets are large, an unreasonable amount of time may be required to complete a total build operation for all the derived datasets, using computer systems of average processing power. Moreover, updated copies of the raw datasets may arrive asynchronously, at various times during the day. Some raw datasets could arrive just before a scheduled cutoff time at which applications, client processes and the like need to access the derived datasets. The scale of a particular pipeline may not allow executing a complete build operation, to create the derived datasets, within a short time. For example, if the latest-arriving dataset is received just one hour before the cutoff time for client access to derived datasets, then there may be insufficient time to perform a full build of the raw datasets into the derived datasets.

What is needed is an improved way to build all the derived datasets, so that all build operations needed to create all derived datasets are assured to complete before the cutoff time.

SUMMARY

The appended claims may serve to summarize the disclosure.

BRIEF DESCRIPTION OF THE DRAWINGS

In the drawings:

FIG. 2B illustrates example relationships of raw datasets to derived datasets.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Embodiments are described in sections below according to the following outline:
GENERAL OVERVIEW
DISTRIBUTED DATABASE SYSTEM OVERVIEW
EXAMPLE PROCESS OF AUTOMATICALLY SCHEDULING BUILD OPERATIONS IN RESPONSE TO ARRIVAL OF RAW DATASETS AND SATISFACTION OF DEPENDENCIES
IMPLEMENTATION EXAMPLE—HARDWARE OVERVIEW
IMPLEMENTATION EXAMPLE—BASIC SOFTWARE SYSTEM
EXTENSIONS AND ALTERNATIVES

General Overview

Techniques for efficient processing of datasets in a data pipeline system are described. In an embodiment, a data processing method comprises, in association with a distributed data processing system that implements one or more data transformation pipelines, each of the data transformation pipelines comprising at least a first dataset, a first transformation, a second derived dataset and dataset dependency and timing metadata, detecting an arrival of a new raw dataset or new derived dataset; in response to the detecting, obtaining from the dataset dependency and timing metadata a dataset subset comprising those datasets that depend on at least the new raw dataset or new derived dataset; for each member dataset in the dataset subset, determining if the member dataset has a dependency on any other dataset that is not yet arrived, and in response to determining that the member dataset does not have a dependency on any other dataset that is not yet arrived: initiating a build of a portion of the data transformation pipeline comprising the member dataset and all other datasets on which the member dataset is dependent, without waiting for arrival of other datasets.

In an embodiment, a data pipeline system may comprise a tree of raw datasets and complex datasets. In an embodiment, a lookup table is stored that identifies the most recent timestamp and/or version of each dataset in the tree. The lookup table may further store dependency data regarding which datasets are dependent on other datasets. The data pipeline system may, upon detecting a modification to a raw dataset, use the lookup table to identify the highest node in the tree for which all dependent datasets, including the modified raw dataset, is ready for building. The data pipeline system may then build the dataset and all downstream datasets that are ready for building immediately, without waiting for additional datasets to be modified.

Other embodiments, aspects and features will become apparent from the disclosure as a whole including the following description, the drawings and the claims.

Distributed Database System Overview

Figure 1:
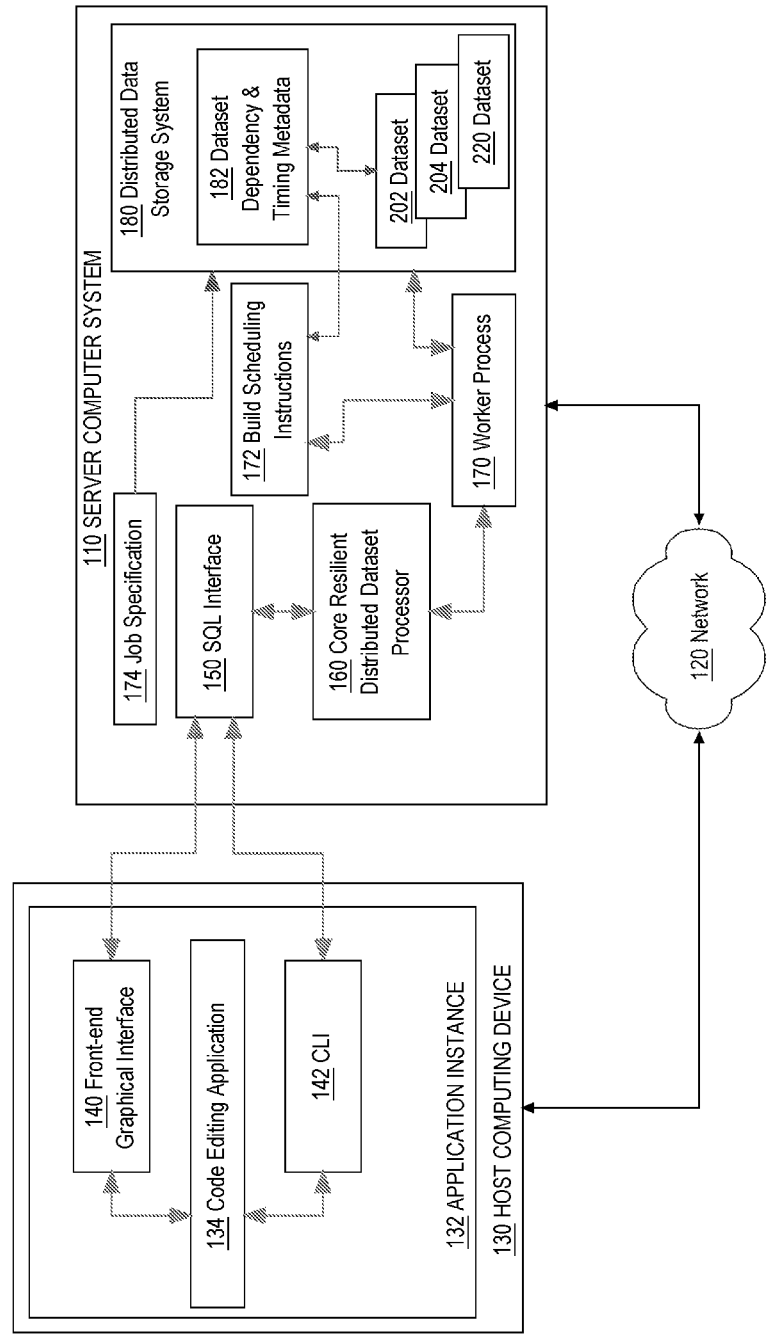
FIG. 1 illustrates a distributed computing system with which embodiments may be implemented.

FIG. 1 illustrates a distributed computing system with which embodiments may be implemented.

In an embodiment, a distributed computing system comprises a server computer ("server") 110 that is coupled via network 120 to a host computing device 130. The distributed computing system can be within one or more data centers, virtual computing facilities or other hosting facilities; other embodiments can be within a networked home, office, or campus.

Network 120 broadly represents a combination of one or more local area networks, wide area networks and internetworks and may include the public internet. The network 120 can connect one or more instances of the host 130 and server 110 together within the distributed computing environment. Network 120 can be composed of multiple sub-networks that are coupled. For example, the network 120 can be an Internet Protocol Version 4-based and/or an Internet Protocol Version 6-based wired or wireless network or a combination of multiple such networks.

Host computing device 130 broadly represents one or many computers and the number of hosts 130 in the system at a given time may vary in different embodiments and any number may be used. In an embodiment, a host 130 can be a single computing device such as computing device 400 that is described below with respect to FIG. 4. Alternatively, a host can be a single virtual computer instance that executes on a computing device facilitated by a virtualization layer (e.g., a Type 1 or Type 2 hypervisor) interposed between the virtual computer instance and the computing device. The virtualization layer can be a virtual machine monitor such as, for example, virtual machine monitor 530 described below with respect to FIG. 5.

Regardless if a single computing device or a single virtual computer instance, a host 130 can be configured with an operating system (e.g., UNIX, LINUX, MACOS, WINDOWS) as illustrated, for example, by operating system 510 described below with respect to FIG. 5. The operating system of a host 130 can manage low-level aspects of the host's operation including managing execution of processes, memory allocation, file input and output (I/O), and device I/O. Furthermore, the operating system of host 130 may manage presentation systems such as a windowed graphical user interface (GUI) and driving a computer display device such as a flat screen display or CRT. A host 130 may also be configured with a container system (e.g., the DOCKER container system) for running services within containers on the host's operating system.

Services that execute as processes on hosts in the distributed computing environment may be configured using the distributed configuration platform described herein or in application Ser. No. 15/284,959, filed Oct. 4, 2016, the entire contents of which is hereby incorporated by reference as if fully set forth herein.

In an embodiment, host 130 comprises an application instance 132 which allows one or more services to be deployed on host 130 from one or more server computing devices, such as server 110. In an embodiment, application instance 132 comprises a code editing application 134, a front-end graphical interface 140 and a command-line interface (CLI) 142 that may interoperate to provide the functions that are described further herein. In some embodiments, the code editing application 134 may be integrated into the distributed data storage system 180 or executed as a service or application on server 110 and coupled to the distributed data storage system, interacting with the application instance 132 using CLI 142, programmatic calls, remote procedure calls (RPC) or HTTP. In an embodiment, the front-end interface 140 and CLI 142 are programmed or configured to interact with one or more server-side functional units of server computer 110 as further described. In an embodiment, either the front-end interface or the CLI can be used to input program code in a source language, SQL queries, statements or transforms to SQL interface 150, in coordination with the code editing application 134 as a text editor.

A service that application 134 facilitates or hosts can be a single instance of a software product or software application installed on at least one of the hosts 130. For example, a service might be a database server instance, a web server instance, or any other instance of a software product or a software application installed on one or more of the hosts 130. Multiple different services may be installed on the hosts 130 including multiple different services on the same host 130. For example, a service may be installed on multiple of the hosts 130 in a distributed, clustered, load balanced, or failover computing arrangement.

In an embodiment, server 110 comprises an SQL interface 150, a core resilient distributed dataset (RDD) processor 160, one or more worker processes 170, and a distributed data storage system 180 that stores, for example, datasets 202, 204, 220 as further described. The datasets 202, 204, 220 broadly represent raw datasets that are stored in, copied to, or otherwise received into the distributed data storage system 180, and derived datasets that are created under program control from one or more raw datasets as sources and using one or more transformations that specify how to transform the raw datasets to yield the derived datasets.

The transformations may comprise any operation that transforms columns or data of a first dataset to columns or data of a second, derived dataset. The first dataset may be a raw dataset or a derived dataset. The transformations may comprise, for example, creating the derived dataset without a column that is in the raw dataset, creating the derived dataset with a column that is in the raw dataset and using a different name of the column in the derived dataset, performing calculations that change data or add columns with different data, filtering, sorting or any other useful transformation.

Distributed data storage system 180 manages dataset dependency and timing metadata 182. In one embodiment, metadata 182 comprises stored data defining or describing both relationships of derived datasets to other related raw or derived datasets, and timestamps of creation or updates to those related raw or derived datasets. Thus, for any derived dataset Dn having dependencies for example upon raw datasets R1 ... Rn and upon derived datasets Dn+1 ... Dm, the dataset dependency and timing metadata contains attributes or records identifying R1 Rn and Dn+1 ... Dm, effectively specifying a build graph of nodes and edges that specify datasets related to other datasets and their dependencies. In an embodiment, metadata 182 further comprises timestamp values for each of R1 ... Rn and Dn+1 ... Dm that indicate the last time at which those datasets were created or updated. Therefore, programmed processes described further herein can access, at any time, a graph of relationships of one derived dataset to dependent or input datasets, as well as data indicating whether those dependent or input datasets have been recently updated.

The dataset dependency and timing metadata 182 also can be implemented using a stored combination of a tree data structure and a lookup table structure. In an embodiment, a stored graph or tree representing dependency information for a plurality of datasets comprising a plurality of nodes, each node of the tree corresponding to a dataset of the plurality of datasets. Further, in an embodiment, dataset dependency and timing metadata 182 comprises a stored lookup table having a plurality of entries that correspond to the plurality of datasets, each particular entry of the plurality of entries corresponding to a particular dataset of the plurality of datasets and comprising a first timestamp representing the time that particular dataset was last modified and a second timestamp representing the time that particular dataset was last used for data processing.

In various embodiments, relationship or graph data, and timestamp data, of the metadata 182 may be maintained in different data structures, tables or files of server 110 and/or distributed data storage system 180. For illustrating a clear example, FIG. 1 and other aspects of this disclosure treat dataset graph data and timestamp data as unified, but separation is possible in an embodiment. Or, an embodiment may maintain a data structure for each dependent dataset that specifies all of its input raw datasets and a timestamp of their last update. Further, an embodiment of the process of FIG. 2A as further discussed may obtain dependency data or dataset graph data by querying or calling a system function or library of the distributed data storage system 180.

As described further in other sections, datasets 202, 204, 220 and any number of other datasets may be arranged in data transformation pipelines that link raw datasets to derived datasets, and derived datasets to other derived datasets, in relationships of arbitrary complexity to permit filtering, copying, transforming, adjusting access controls, and many other kinds of data operations. The three datasets 202, 204, 220 of FIG. 1 are shown merely to illustrate a clear example and other embodiments may have any number of datasets.

In an embodiment, SQL interface 150 is programmed or configured to receive electronic digital messages that define database operations according to a structured query language, parse the messages to determine the operations, and instruct the core RDD processor 160 to execute the operations. Typically, execution of the operations causes instructing one or more worker processes 170 to execute builds of derived datasets, based on raw datasets, with distributed data storage system 180. In one implementation, SQL interface 150 comprises an executable instance of SPARK SQL; the core RDD processor 160 is an executable instance of the SPARK Core; and distributed database system 180 may be an executable instance of a HADOOP file system or a hierarchical distributed database server that implements object immutability.

In an embodiment, the build operations are automatically scheduled at different times under the control of build scheduling instructions 172, which may implement the algorithms and processes that are described further in other sections. Furthermore, build operations may be executed according to a job specification 174 that is generated by worker process 170 or received via configuration data from application instance 132 or other sources.

In general, SQL interface 150 provides a flexible and efficient way to indirectly specify rows in a database to be acted upon, with the security of not explicitly transmitting row identifiers across a network connection, but its use is optional and other ways of specifying or identifying rows could be used in other embodiments. For example, as an alternative to an SQL query, a set of explicit row identifiers may be cryptographically hashed using SHA-256 or another hash algorithm and the resulting hash strings may be transmitted in a request to the processor 160. The processor 160 then may command worker process 170 to compare the hash string values to an index of previously prepared hash string values of rows of datasets in the distributed data storage system 180, and then delete rows where a hash match is found. Both the SQL approach and hash approach have the benefit of avoiding transmission of an explicit row identifier, which could be recorded in a log file or otherwise stored in an unanticipated manner.

In an embodiment, each of the code editing application 134, SQL interface 150, core RDD processor 160, worker process 170, build scheduling instructions 172 and distributed data storage system 180 comprises a set of one or more pages of main memory, such as RAM, in the host computer 130 or server 110 into which executable instructions have been loaded and which when executed cause each respective computer to perform the functions or operations that are described herein with reference to those functional units. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, each of the aforementioned instructions also may represent one or more files or projects of source code that are digitally stored in a mass storage device such as non-volatile RAM or disk storage, in the server 110 or a separate repository system, which when compiled or interpreted cause generating executable instructions which when executed cause the server 110 to perform the functions or operations that are described herein with reference to those modules. The specific manner in which programmers or software developers organize and arrange source code for later compilation into an executable, or interpretation into bytecode or the equivalent, for execution by the server 110 or host computing device 130, is not critical.

Figure 2A:
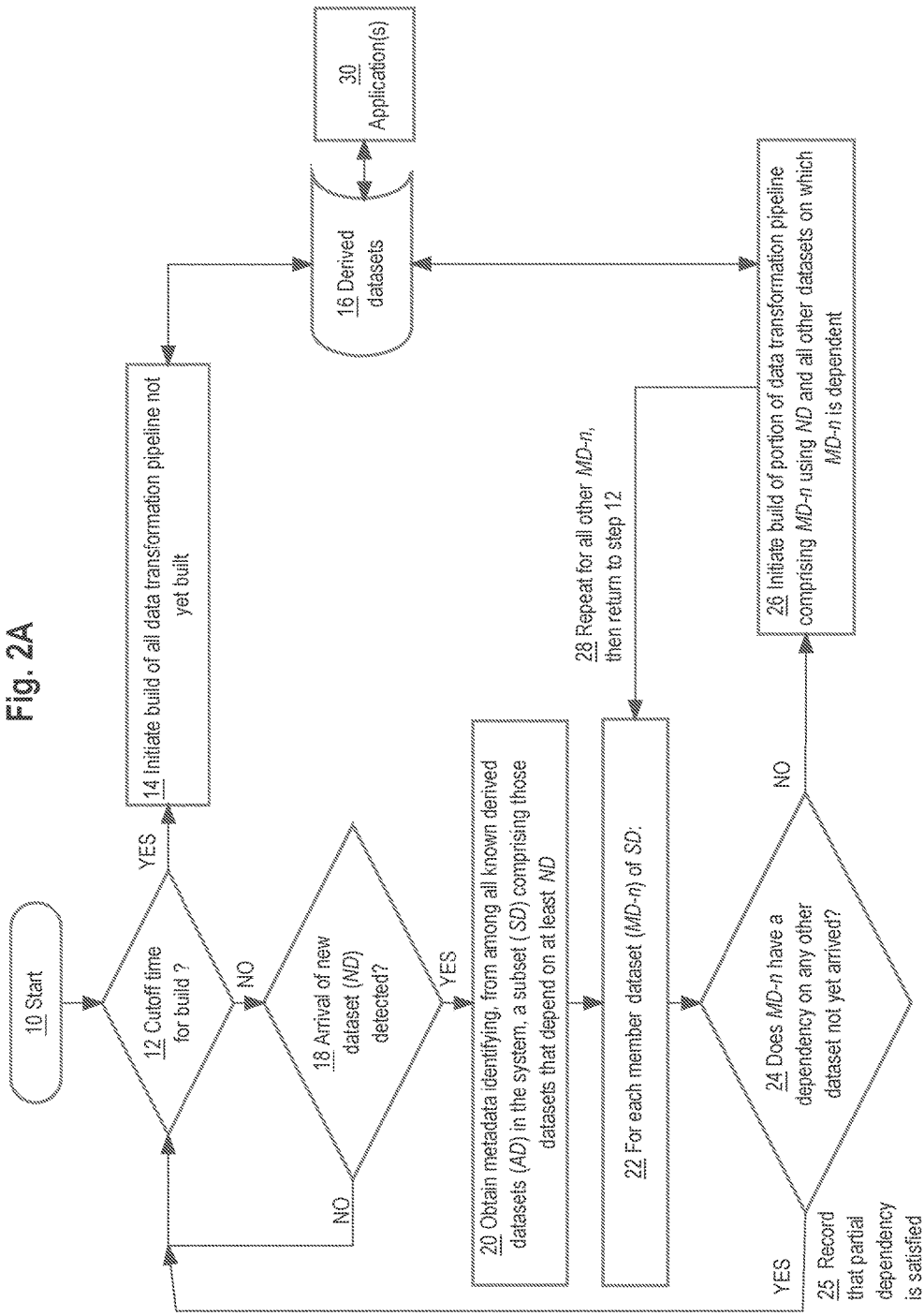
FIG. 2A illustrates an example algorithm or process of scheduling build operations for derived datasets based upon dependency relationships and in response to arrival of raw datasets, in one embodiment.

Example Process of Automatically Scheduling Build Operations in Response to Arrival of Raw Datasets and Satisfaction of Dependencies FIG. 2A illustrates an example algorithm or process of scheduling build operations for derived datasets based upon dependency relationships and in response to arrival of raw datasets, in one embodiment. FIG. 2A and any other flow or process description in this disclosure is intended to represent an algorithm or plan for programming computer programs at the same level of detail that skilled persons in this field use to communicate among themselves about the architecture, process or data flow, arrangement, ordering and content of similar computer programs of similar types. That is, the flow diagrams and process descriptions are presented at a level of detail that skilled persons in this field have determined to be sufficient to communicate between themselves the baseline information that is adequate to permit the coding, completion, testing and deployment of computer programs that will execute and operate to provide the functions that are described herein.

Referring first to FIG. 2A, in one embodiment, a scheduling process initiates execution at a start block 10. At block 12, the process tests whether a cutoff time for build operations has occurred. "Cutoff time," in this context, refers to any specified or stored time, deadline, stop time, completion time and the like, after which clients such as applications 30 or other systems can be expected to access all derived datasets that have been stored using the distributed database system 180. Typically, the cutoff time is the same every day, but in some embodiments, it may vary or be subject to adjustment.

If the cutoff time for build operations has occurred, then control passes to block 14, at which the process optionally initiates a build of all parts of the data transformation pipeline that have not yet been built. Block 14 involves initiating build operations to yield all derived datasets that have been previously defined in the distributed database system 180, but not yet built. Block 14 can be important in situations in which a particular raw dataset is expected, but never arrives, for example. If that happens, then the build scheduling instructions 172 and the process of FIG. 2A may be programmed to proceed with build operations anyway.

If any such non-built derived datasets have been defined, then the time required to build them will be non-zero, and will begin after the cutoff time that was determined at block 12. The result is that at least one derived dataset will not be current just after the cutoff time, when a client might access it. Therefore, block 14 is performed optionally in situations in which completion of derived datasets is more important than unfettered client access. In other situations, block 14 may be considered optional and the process may offer access to derived datasets represented at block 16 without further build operations. In that case, some derived datasets may be stale, but available. Or, in another embodiment, the cutoff time tested at block 12 may be configured with a buffer or margin of error, that is, as intentionally early enough to permit at least some build operations to occur at block 14 before clients are expected to access derived datasets. In another embodiment, the client is given access to a pre-build version of the data while the build is in process. When the build is completed, the client is given access to the updated version.

Optionally, block 14 may include generating and transmitting a notification message or alert to the application instance 132, or using e-mail, or using other forms of messaging, to an administrator or other account or party based upon configuration data. Notifications or alerts also may be used in response to build failures at block 14, block 26. Furthermore, in an embodiment, the dataset dependency and timing metadata 182 may include a critical dataset flag which, when set for a particular dataset, means that a pipeline refresh cannot occur unless a refresh update for that particular dataset is received. In an embodiment, if block 14 is reached and a refresh update has not been received for a dataset for which the critical dataset flag is set, an alert, alarm or other notification is transmitted to a specified location.

If the test of block 12 is false, then time remains to perform other build operations. Control passes to block 18 in which the process tests whether a new dataset has arrived. "Arrived," in this context, may mean updated, stored with a new timestamp, received, detected or otherwise available, with any modification, as specified by comparing a timestamp of a dataset in the distributed database system 180 to the corresponding timestamp value for the same dataset that is recorded in metadata 182. The new dataset may be a raw dataset or a derived dataset from a prior transformation in the distributed database system 180 or another system.

A first dataset may arrive spaced-apart in time from a second dataset, and arrivals may occur periodically, irregular or at arbitrary or various times. A new dataset can arrive through a copy operation, an import operation, a write operation by another program or process, or a prior build operation. The specific mechanism for arrival is not critical and the system is presumed to provide a way to detect that a dataset or file has been stored in the system and to generate notifications in response to such an event. For example, there may be an independent service that periodically polls the file creation time or file update time of all files in a specified folder or directory and compares those time values to corresponding timestamp values in metadata 182.

The execution of block 18 can be constrained to a specified set of raw datasets that are defined as inputs or in configuration data. That is, the process of FIG. 2A can be programmed to access a list of raw datasets to track, and then use block 18 to test only whether one of the raw datasets in the list has arrived.

Furthermore, the time of executing block 18, or the process of FIG. 2A in total, may occur at different times or on different days according to configuration data stored in association with the distributed database system 180. For example, a flexible raw dataset landing cadence may be accommodated by defining an expected time window, e.g., in terms of days, during which new datasets are expected to arrive. As one specific example, within a calendar month, the process of FIG. 2A could be scheduled to execute only between the 12th and 13th days of the month, as specified in stored configuration data. Thus, block 18 may comprise performing the detecting an arrival of a new raw dataset or new derived dataset only during an expected arrival period that is defined in stored configuration data.

Further, a list of raw datasets may be configured to identify the raw datasets based on an expected arrival time window, thereby allowing the system to only track the dataset during the expected arrival time window. For example, if a raw dataset is expected to arrive during 5 pm and 7 pm during a day or 12th and 13th days of the month, the process will not need to track this raw dataset outside the expected arrival time window.

If no new dataset has arrived, then control returns to block 12 to re-test whether the cutoff time has occurred.

A new dataset that is detected at block 18 is denoted ND in this description, solely as a shorthand label for convenience and compactness in this description, but not as a requirement for an implementation or embodiment. At block 20, in response to detecting arrival of ND, the process obtains metadata that identifies, from among all known derived datasets AD in the system, a subset SD comprising those datasets that depend on at least ND. Obtaining may comprise reading, querying, retrieving or using a programmatic call to obtain. The metadata may be stored in a catalog or other repository of the distributed database system 180 that registers, indexes, defines or holds data relating to derived datasets and their relationships to raw datasets or other derived datasets. That is, the metadata defines, for a specified derived dataset, all dependencies of that derived dataset, and the dependencies may be raw datasets or other derived datasets. Therefore block 20 effectively comprises determining all derived datasets that have ND as at least one input or dependency.

Furthermore, the execution of block 20 introduces dynamism into the process of FIG. 2A by ensuring that current metadata specifying relationships of datasets to one another is loaded each time that the process executes. Since build graphs of relationships of datasets can change over time, loading relationship metadata at block 20 ensures that the process of FIG. 2A properly responds to any changes in dependencies or relationships that have been entered since the last iteration.

At block 22, the process begins executing a loop that is iterated for each member dataset MD-n of SD. That is, each dataset defined in the system that has ND as at least one input or dependency is processed using blocks 24, 25, 26, 28 as shown.

At block 24, in one embodiment, the process tests whether MD-n has a dependency on any other dataset that is not yet received. The previously retrieved metadata may be used for this purpose. Block 24 effectively checks whether a derived dataset, for which ND is a dependency or needed as input, has any other dependencies on other datasets that are not yet received. Block 24 may incorporate staleness testing logic to determine, if such other datasets are found in storage, whether the datasets were recently received. For example, such other datasets can be regarded as stale or invalid if they were received more than 24 hours earlier. Configuration data may specify, as part of registering a definition of a derived dataset, the length of time after which dependent data is considered stale. Thus, in block 24 or other blocks, detecting an arrival of a new raw dataset or new derived dataset may comprise determining that a timestamp of the new raw dataset or new derived dataset is not older, compared to a current time, than a specified recent time If the result of block 24 is NO or FALSE, then control passes to block 26, at which the process initiates a build of a portion of the data transformation pipeline comprising MD-n, using ND and all other datasets on which MD-n is dependent. In effect, in response to arrival of the last dataset ND on which MD-n depends, a build of MD-n can commence immediately without waiting for the arrival of any other raw or derived datasets that relate to other parts of the data transformation pipeline. Block 26 may comprise creating and storing a job specification 174 (FIG. 1) and calling or instructing a worker process 170 to initiate a build based upon references to MD-n, ND and all other dependencies, and the job specification. Thereafter, the worker process independently executes the build, with the result of storing the derived dataset MD-n in the system.

Meanwhile control transfers back to block 22 to process all other MD-n, as indicated at reference 28. If all other MD-n have been processed, so that the newly received dataset ND is not related to any other derived datasets, then control passes to block 12.

Referring again to block 24, if the test is YES or TRUE, then ND represents one of several dependencies of MD-n. In response, as seen at reference 25, metadata or other records may be marked to indicate the arrival of one dataset ND on which MD-n is dependent. In subsequent iterations, at the time of evaluating a different newly arrived dataset ND, logic implementing block 22 may refer to the marking to verify whether all dependencies of MD-n have been satisfied. After the step of reference 25, control may transfer to block 12 to check again whether the cutoff time has arrived and await the arrival of other new datasets ND.

The logic that is programmed for block 20, 22, 24, 25, 26, 28 may include other programming to process certain special cases. For example, metadata 182 may specify that a particular dataset is only updated at the end of a calendar month, and FIG. 2A may be programmed to skip or ignore such datasets when the process is executing other than at the end of a calendar month.

Furthermore, block 20, 22, 24 may comprise performing a breadth-first search of a dependency graph or build tree to identify the highest derived dataset node that is eligible for building. That is, the process may be programmed to detect that a dataset has arrived, to find a location of that dataset in the build graph, and then find the highest possible derived dataset that can be built in response. And, block 20, 22, 24 may incorporate logic that observes time constraints. For example, after block 18, in response to detecting the modification to the first dataset, block 20 may comprise updating the first timestamp that corresponds to the first dataset and traversing the tree stored as part of dataset dependency and timing metadata 182 to identify the highest parent node in the tree for which all downstream nodes have a corresponding first timestamp that is later in time than a corresponding second timestamp.

The logic that is programmed for block 20, 22, 24, 25, 26, 28 may include other programming to process different types of relationships of datasets. For example, non-directional dependency group logic may be provided. In this embodiment, a plurality of datasets that are dependent upon one another are marked as a group in the metadata 182, and are processed in FIG. 2A as a group. That is, the group of datasets is considered updated as a whole, and downstream build operations for derived datasets are started, only when all datasets in the group have received updates, as indicated by their last timestamps.

Or, in an embodiment, directional dependency may be implemented in which a first group of raw datasets is dependent on a second group of datasets. In this situation, FIG. 2A may be programmed to consider the first group of datasets to be updated only after all datasets in the second group are updated.

These approaches may be useful, for example, when two datasets each represent halves of a complete dataset, or keys plus values, or other alternatives.

FIG. 2B illustrates example relationships of raw datasets to derived datasets. In the example of FIG. 2B, a data transformation pipeline 200 may be graphically illustrated as a multiway tree in which nodes represent datasets and edges represent relationships or dependencies. While FIG. 2B depicts a tree structure, in other embodiments, the dependencies may form a graph structure. Data transformation pipeline 200 may comprise raw datasets R1, R2, R3, R4, which have relationships to derived datasets D1, D2, D3, D4. Selected derived datasets D5, D6 have relationships to other derived datasets D4, D5. Thus a derived dataset may be dependent only upon one or more raw datasets, only upon one or more derived datasets, or upon a combination of each.

FIG. 2B illustrates a limited number of raw datasets and derived datasets for purposes of illustrating a clear example. In practical embodiments, there may be any number of raw or derived datasets and embodiments are specifically contemplated for processing hundreds of each type of dataset; higher limits are possible in other embodiments in proportion to the computing resources that are available and the data processing time that is acceptable.

In this example, derived dataset D1 can be computed or built immediately after R1 arrives. Similarly, D2 can be built as soon as R3 arrives. D3 can be built as soon as R4 is available, and immediately thereafter a build of D5 can begin since D5 is dependent solely on completion of D3. Building D4 can start as soon as derived datasets D1, D2 have arrived, and D6 can be built as soon as D4, D5 are both complete.

Figure 3A:
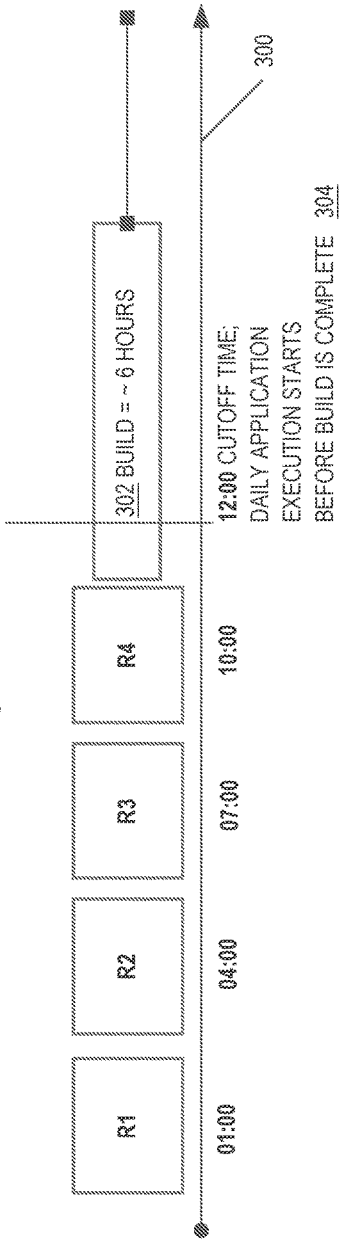
FIG. 3A illustrates an example timing relationship of arrival of raw datasets to a single comprehensive build process.

FIG. 3A illustrates an example timing relationship of arrival of raw datasets to a single comprehensive build process. In FIG. 3A, a hypothetical timeline 300 is marked with times of 01:00, 04:00, 07:00, 10:00, 12:00, corresponding to the period 1:00 AM to 12:00 PM in a hypothetical day. Raw datasets R1, R2, R3, R4 arrive in the distributed database system at 01:00, 04:00, 07:00, 10:00, respectively, and 12:00 has been set as the daily cutoff time. Assume that the raw datasets have the same relationships to derived datasets as seen in FIG. 2B. In the approach of FIG. 3A, build process 302 starts, using R1 to R4 inclusive, only after the final dataset R4 has arrived, and requires approximately 6 hours hypothetically to build all derived datasets that have been defined in the system.

The 6-hour build time will complete about 4 hours after the daily cutoff time, so many derived datasets are not available to clients at the cutoff time. While the times given here are hypothetical, it will be apparent that in some scenarios the aggregate build time involved in waiting for all raw datasets to arrive is impractical. Furthermore, an extremely large amount of working memory or storage may be required in the distributed database system 180 to perform all needed build operations at the same time. When the distributed database system 180 is implemented using shared cloud computing facilities, it may be necessary to spin up or instantiate additional virtual machines or take control of additional physical machines to provide enough memory, storage or CPU power to accomplish a complete build.

Figure 3B:
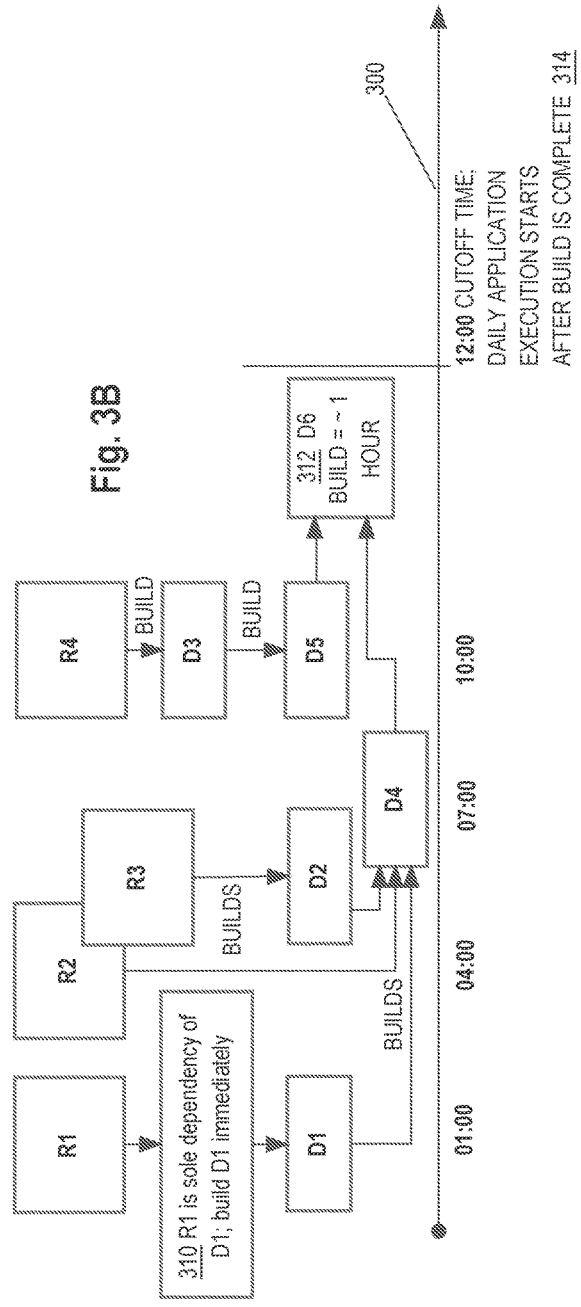
FIG. 3B illustrates an example timing relationship of arrival of raw datasets to automatically scheduled build operations, according to an embodiment.

In sharp contrast, using the techniques of FIG. 2A, the undesirable result of FIG. 3A can be avoided. FIG. 3B illustrates an example timing relationship of arrival of raw datasets to automatically scheduled build operations, according to an embodiment. In this example, the time line 300 is the same, and the relationships of FIG. 2B also apply.

Assume that R1 is received at 01:00. Because R1 is the sole dependency of D1, the process of FIG. 2A can operate to cause executing a build of D1 immediately, as seen at block 310.

Next assume that R2 arrives at 04:00. D4 is dependent on R2 and D1 which was already built, but also has dependency on D2. Therefore, at 04:00, no new build starts. Assume next that R3 arrives at 05:30. R3 is the sole dependency of D2, so the process of FIG. 2A is executed to cause an immediate build of D2. When that build is complete, then a build of D4 can commence immediately under the approach of FIG. 2A.

Now assume that R4 arrives at 10:00. With the method of FIG. 2A, a build of D3 starts immediately, followed by a build of D5. Since D6 is dependent on D5 and D4, which are now ready, a build of D6 can begin as soon as D5 is done, and might take less than 1 hour. Therefore, when the cutoff time of 12:00 arrives, daily execution of an application can start after all builds are complete, as seen at block 314.

These examples illustrate that the method of FIG. 2A is effective to solve the problems that have been outlined in the Background and illustrated with FIG. 3A. The processing of complex data transformation pipelines is made considerably more efficient by initiating a build of a derived dataset in response to determining that all dependencies of the derived dataset, in terms of raw datasets or other derived datasets, have been satisfied. Rather than waiting until the last of all raw datasets has arrived asynchronously, and then attempting to build all needed derived datasets, the process automatically and selectively schedules a build of each derived dataset as soon as all its dependencies are satisfied.

Consequently, each individual build consumes far less memory, storage and CPU cycles than for a comprehensive build. Furthermore, fewer computers overall may be needed because the same computer or virtual machine can be reused for successive individual builds of derived datasets as dependencies are satisfied, rather than using a much larger amount of resources later for all builds at the same time. Still further, when a daily refresh cycle is observed, implementation of the processes herein may permit the daily cutoff time to be pushed back earlier, so that clients may access derived datasets sooner. And, in some embodiments, the approach herein can eliminate the need to perform extra builds of the same dataset within the same day, thereby building only when necessary and using computing resources in an optimal way.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
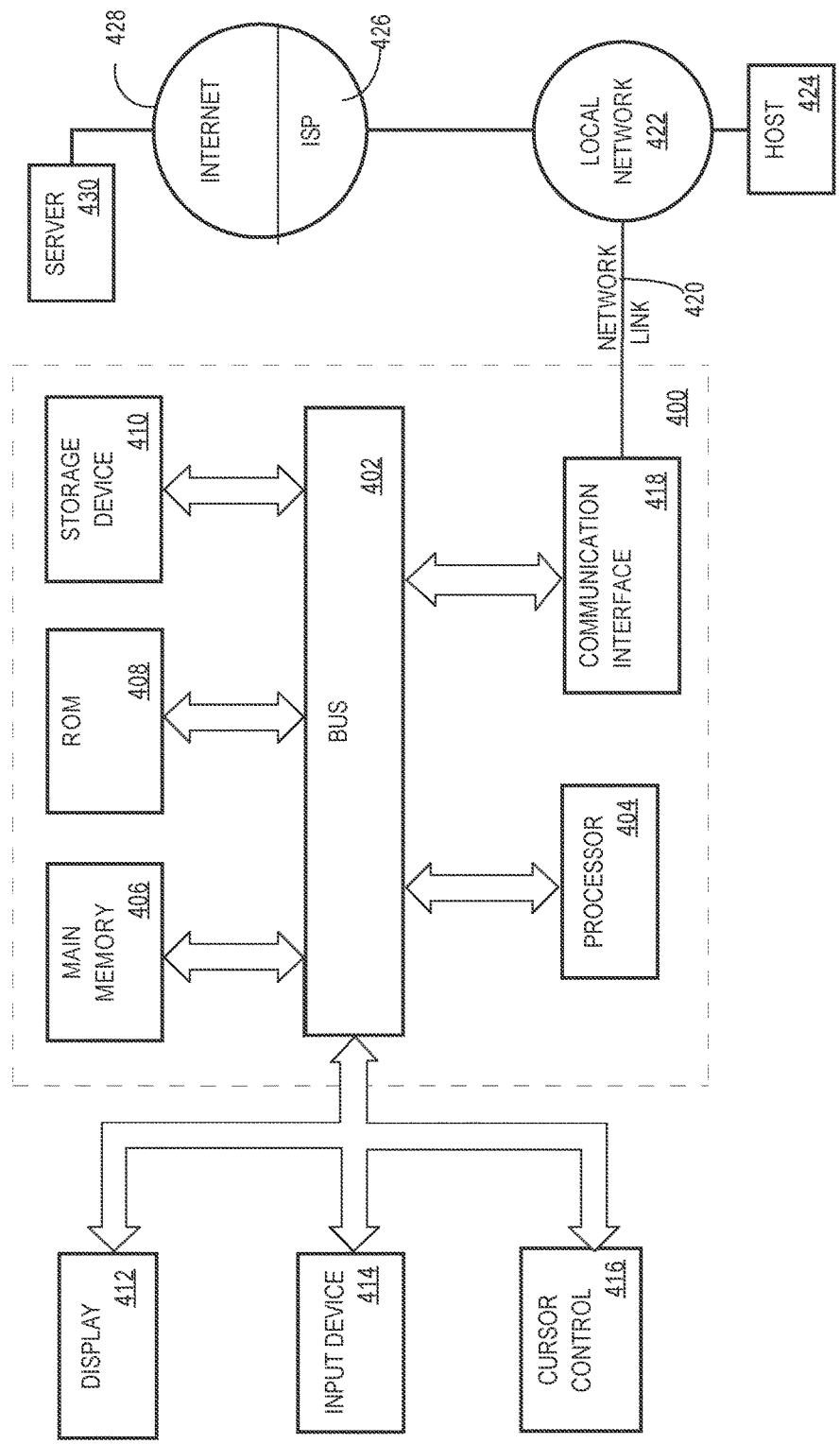
FIG. 4 is a block diagram that illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Implementation Example—Basic Software System

Figure 5:
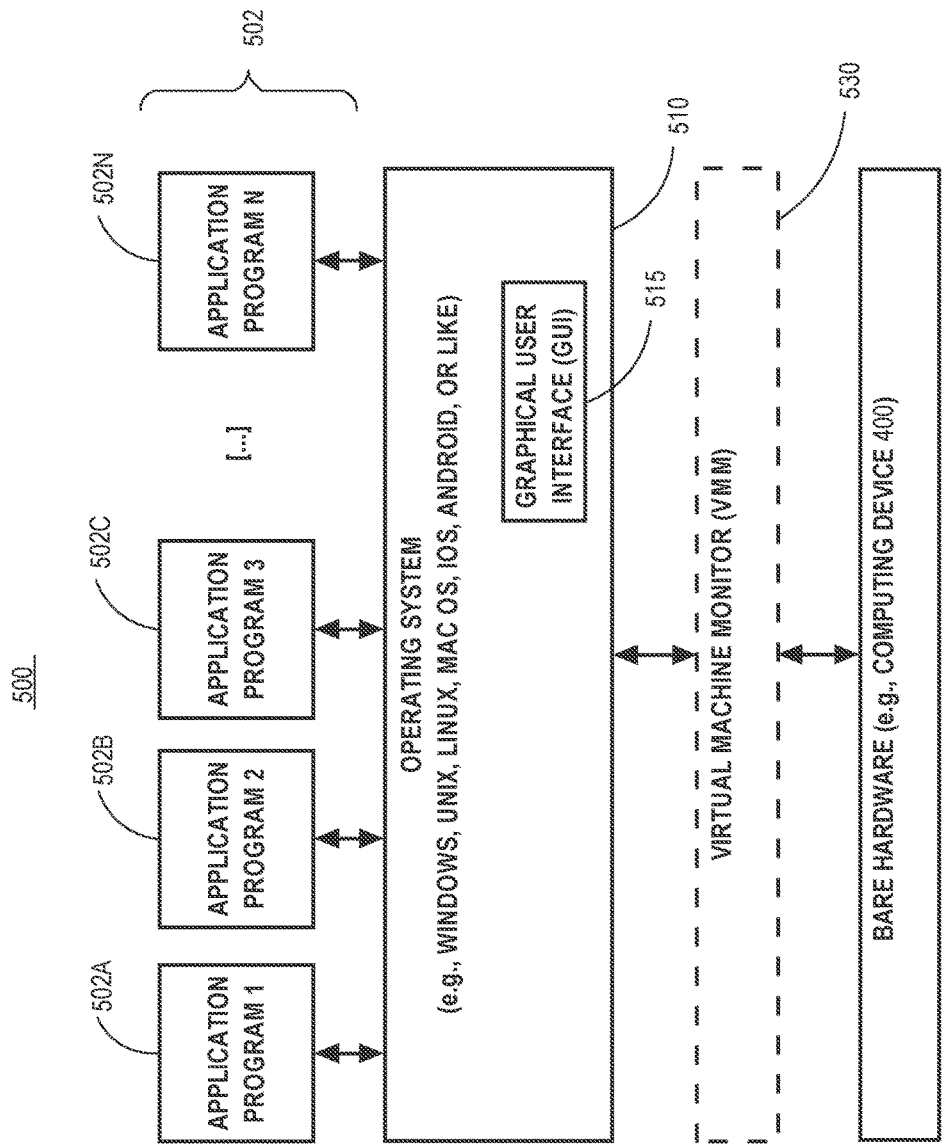
FIG. 5 is a block diagram of a basic software system that may be employed for controlling the operation of a computing device.

FIG. 5 is a block diagram of a basic software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:
in association with a distributed data processing system that implements one or more data transformation pipelines, each of the data transformation pipelines comprising at least a first dataset, a first transformation, a second derived dataset and dataset dependency and timing metadata, detecting an arrival of a new raw dataset or new derived dataset;
in response to the detecting, obtaining from the dataset dependency and timing metadata a dataset subset comprising those datasets that depend on at least the new raw dataset or new derived dataset;
for each member dataset in the dataset subset, determining if the member dataset has a dependency on any other dataset that is not yet arrived, and in response to determining that the member dataset does not have a dependency on any other dataset that is not yet arrived:
initiating a build of a portion of the data transformation pipeline comprising the member dataset and all other datasets on which the member dataset is dependent, without waiting for arrival of other datasets;
detecting that a cutoff time has occurred, and in response thereto:
determining that a particular dataset on which the second derived dataset depends has not arrived;
in response thereto, initiating build operations for all other portions or derived datasets of the data transformation pipeline that have not yet been built but excluding the other portions or derived datasets that depend upon the particular dataset;
wherein the method is performed using one or more processors.

2. The method of claim 1, further comprising, in response to determining that the member dataset has a dependency on another dataset that is not yet arrived, recording that a partial dependency of the member dataset has been satisfied.

3. The method of claim 1, further comprising detecting that a cutoff time has occurred, and in response thereto, initiating build operations for all other portions or derived datasets of the data transformation pipeline that have not yet been built.

4. The method of claim 1, the first dataset comprising any of a first raw dataset, or a first derived dataset that was derived via a second transformation.

5. The method of claim 1, the transformation comprising any of:
creating the derived dataset without a column that is in the raw dataset;
creating the derived dataset with a column that is in the raw dataset and using a different name of the column in the derived dataset.

6. The method of claim 1, further comprising:
in response to determining that the particular dataset has not arrived, transmitting a notification to a specified account or address.

7. The method of claim 1, further comprising:
detecting that a cutoff time has occurred, and in response thereto:
determining that the particular dataset is marked with a critical dataset flag value;
in response thereto, transmitting a notification to a specified account or address.

8. The method of claim 1, further comprising performing the detecting an arrival of a new raw dataset or new derived dataset only for datasets that are identified in a list of raw datasets to track.

9. The method of claim 1, further comprising performing the detecting an arrival of a new raw dataset or new derived dataset only during an expected arrival period that is defined in stored configuration data.

10. The method of claim 1, in which obtaining the dataset subset from the dataset dependency and timing metadata occurs just after the dataset dependency and timing metadata has been updated.

11. The method of claim 1, wherein detecting an arrival of a new raw dataset or new derived dataset comprises determining that a timestamp of the new raw dataset or new derived dataset is not older, compared to a current time, than a specified recent time.

12. The method of claim 1, wherein initiating a build comprises instantiating a build worker process and instructing the build worker process to build the portion of the data transformation pipeline comprising the member dataset and all other datasets on which the member dataset is dependent.

13. The method of claim 1, the dataset dependency and timing metadata defining a non-directional dependency group of a plurality of datasets that are dependent upon one another, the method further comprising determining whether every dataset in the non-directional dependency group is updated, and initiating build operations for derived datasets depending upon the non-directional dependency group only when all datasets in the non-directional dependency group have received updates.

14. The method of claim 1, the dataset dependency and timing metadata defining a directional dependency group of raw datasets all of which are dependent on a second group of datasets, the method further comprising determining that the first group of datasets is updated only after all datasets in the second group are updated, and initiating build operations for derived datasets depending upon the directional dependency group only when all datasets in the directional dependency group have received updates.

15. A computer-implemented method comprising:
storing a tree representing dependency information for a plurality of datasets comprising a plurality of nodes, wherein each node of the tree corresponds to a dataset of the plurality of datasets;
storing a lookup table that stores a plurality of entries that correspond to the plurality of datasets, each particular entry of the plurality of entries corresponding to a particular dataset of the plurality of datasets and comprises a first timestamp representing the time that particular dataset was last modified and a second timestamp representing the time that particular dataset was last used for data processing;
detecting a modification to a first dataset of the plurality of datasets;
in response to detecting the modification to the first dataset, updating the first timestamp that corresponds to the first dataset;
in response to detecting the modification, traversing the tree to identify the highest parent node in the tree for which all downstream nodes have a corresponding first timestamp that is later in time than a corresponding second timestamp;
initiating a build of a portion of a data transformation pipeline comprising the identified highest parent node in the tree;
wherein the method is performed using one or more processors.

16. A computer system comprising:
one or more processors;
one or more computer-readable storage media coupled to the one or more processors and storing one or more sequences of instructions which, when executed using the one or more processors, cause the one or more processors to perform:
in association with a distributed database system that implements one or more data transformation pipelines, each of the data transformation pipelines comprising at least a first dataset, a first transformation, a second derived dataset and dataset dependency and timing metadata, detecting an arrival of a new raw dataset or new derived dataset;
in response to the detecting, obtaining from the dataset dependency and timing metadata a dataset subset comprising those datasets that depend on at least the new raw dataset or new derived dataset;
for each member dataset in the dataset subset, determining if the member dataset has a dependency on any other dataset that is not yet arrived, and in response to determining that the member dataset does not have a dependency on any other dataset that is not yet arrived:
initiating a build of a portion of the data transformation pipeline comprising the member dataset and all other datasets on which the member dataset is dependent, without waiting for arrival of other datasets;
detecting that a cutoff time has occurred, and in response thereto:
determining that a particular dataset on which the second derived dataset depends has not arrived;
in response thereto, initiating build operations for all other portions or derived datasets of the data transformation pipeline that have not yet been built but excluding the other portions or derived datasets that depend upon the particular dataset.

\* \* \* \* \*